United States Patent [19]
Ito et al.

[11] Patent Number: 4,701,770
[45] Date of Patent: Oct. 20, 1987

[54] SUBSTRATE FOR AN OPTICAL DISC

[75] Inventors: Akio Ito, Katano; Hideaki Mochizuki, Higashiosaka; Masaaki Sunohara, Hirakata; Tooru Tamura, Ikeda, all of Japan

[73] Assignee: Matsushita Electric Industrial Co., Ltd., Osaka, Japan

[21] Appl. No.: 873,405

[22] Filed: Jun. 12, 1986

[30] Foreign Application Priority Data

Jun. 14, 1985 [JP] Japan .................................. 60-130142
Jun. 14, 1985 [JP] Japan .................................. 60-130143

[51] Int. Cl.$^4$ ........................ G01D 9/00; G01D 15/10; G03C 1/495; G03C 1/76
[52] U.S. Cl. ............................... 346/135.1; 346/76 L; 430/271; 430/533; 430/945
[58] Field of Search ............... 430/271, 533, 495, 945; 346/135.1, 76 L

[56] References Cited

U.S. PATENT DOCUMENTS

| 4,407,995 | 10/1983 | Dick ..................................... 524/108 |
| 4,477,555 | 10/1984 | Oba et al. ....................... 346/76 L X |
| 4,565,772 | 1/1986 | Takeoka et al. ................. 430/324 X |
| 4,583,102 | 4/1986 | Tamura et al. ................. 430/495 X |
| 4,614,951 | 9/1986 | Osato'et al. ....................... 346/135.1 |

Primary Examiner—E. A. Goldberg
Assistant Examiner—Patrick W. Foster
Attorney, Agent, or Firm—Wenderoth, Lind & Ponack

[57] ABSTRACT

There is provided an optical disc of high reliability, with the recording film protected from deterioration. The optical disc of this invention is produced by forming a tellurium suboxide film or optomagnetic recording film on a substrate made by injection molding from a polycarbonate resin. The substrate is made from a polycarbonate resin containing a phosphite ester-based antioxidant in a specific low amount.

1 Claim, No Drawings

SUBSTRATE FOR AN OPTICAL DISC

BACKGROUND OF THE INVENTION

1. Field of the Invention

The present invention relates to an optical disc on which signals are recorded and from which recorded signals are read by means of reflection or transmission of laser light.

2. Description of the Prior Art

At present, optical discs are commercially available as digital audio discs (compact disc) and optical video discs. They are read only discs on which unerasable information has been recorded. On the other hand, researches and developments have become active for write once optical discs and erasable optical discs which are expected to be promising storage media for images, documents and data.

The optical disc is made up of a substrate and a recording film formed thereon, and the substrate is made of glass or transparent resin. The resin substrate is required to have the following performances.

(1) Good moldability and good transferability of mold pattern.

(2) High light transmittance.

(3) Small optical anisotropy (Referred to as birefringence hereinafter).

(4) High mechanical strength.

(5) Good durability to retain the initial physical properties for a long time under severe environmental conditions.

(6) Good receptivity to the recording film.

In the case of the read only optical disc, the recording film is aluminum deposited on the disc substrate. In the case of the write once or erasable optical disc, there have been developed various types of recording films such as melt type, phase transition type, opto-magnetic type, and sublime type.

The optical disc substrate should be unreactive to the recording film. In other words, it should not contain a volatile substance or bleeding substance which reacts with the recording film to deteriorate it.

In view of the above-mentioned requirements, raw material of the optical disc substrate has been an acrylic resin or specific polycarbonate resin.

There is disclosed in Japanese Patent Application Laid-open Nos. 58-126119 and 58-180553 a specific polycarbonate resin for optical disc substrate which has a small average molecular weight and contains at least 0.005 wt % of antioxidant. The average molecular weight of the polycarbonate resin is made relatively small thereby reducing birefringence. According to these prior art references, the polycarbonate resin is incorporated with a phosphorus-based antioxidant to prevent the thermal degradation (thermal decomposition) which would otherwise occur at the time of molding. With the amount at least 0.005 wt %, usually 0.01 to 0.1 wt %, as disclosed, the added antioxidant adversely affects the recording film in a high-temperature, high-humidity environment.

SUMMARY OF THE INVENTION

It is an object of the present invention to provide an optical disc which is stable over a long period of time by using a disc substrate which does not adversely affect the recording film.

In order to achieve this object, an optical disc of the invention comprises an optical disc substrate of bis(hydroxyphenyl)alkane polycarbonate resin and a recording film formed thereon, the polycarbonate resin having an average molecular weight of 13000 to 22000 and containing 0 to 0.0025 wt % of phosphite ester represented by the following structural formula:

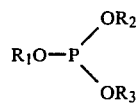

(where $R_1$ and $R_2$ are alkyl groups or aryl groups, and $R_3$ is a hydrogen atom, alkyl group, or aryl group.)

On account of the above-mentioned construction, the recording film is protected from corrosion and deterioration, and the optical disc has a reduced birefringence and an improved CN ratio.

DESCRIPTION OF THE PREFERRED EMBODIMENTS

The dis(hydroxyphenyl)alkane used in this invention includes, for example, 2,2-bis(4-hydroxyphenyl)propane (referred to as bisphenol A hereinafter), 2,2-bis(4-hydroxyphenyl)butane, 2,2-bis(4-hydroxyphenyl)pentane, 2,2-bis(4-hydroxyphenyl)octane, and 1,1-bis(4-hydroxyphenyl)ethane. The polycarbonate resin should have an average molecular weight of 13000 to 22000 which is calculated according to the ordinary viscosity method. With an average molecular weight higher than 22,000, the polycarbonate resin has a high melt viscosity and a poor fluidity in injection molding, so that the obtained substrate has a high birefringence. On the other hand, a polycarbonate resin having an average molecular weight lower than 13,000 is too poor in mechanical properties to be made into an optical disc substrate.

The phosphite ester used in this invention is a compound represented by the above-mentioned structural formula wherein $R_1$ and $R_2$ are alkyl groups such as butyl group, hexyl group, decyl group, and cyclohexyl group, or aryl groups such as phenyl group and nonylphenyl group; and $R_3$ is a hydrogen atom or the above-mentioned alkyl group or aryl group. Examples of this compound include triphenyl phosphite, tris(nonylphenyl) phosphite, tris(2,4-di-t-butylphenyl)phosphite, 2-ethylhexyldiphenyl phosphite, and didecyl-monophenyl phosphite.

The phosphite ester should be added in an amount at most 0.0025 wt % with respect to the weight of the polycarbonate resin. An excessive amount of phosphite ester deteriorates the recording film. If the phosphite ester as an antioxidant is not added at all, the polycarbonate resin is unstable when it is heated and melted for moldings. However, the antioxidant is not always necessary when the polycarbonate resin has a high purity. In other words, a pure polycarbonate resin is stable to heat at the time of molding. This is demonstrated by the experiment examples mentioned later. A pure polycarbonate resin has another advantage that the number of uncorrectable defects greatly decreases below the number of the substitute tracks even though it is not incorporated with a phosphite ester. In the case of polycarbonate resin of ordinary purity, uncorrectable defects occur in large numbers if it does not contain phosphite ester at all. (The error rate of an optical disc is measured in terms of electrical signals by using a testing player.) In the meantime, the purity of a polycarbonate resin is determined by measuring the conductivity of an extract of the resin.

tor. The measurements were carried out along a circle 110 mm in diameter on the optical disc substrate.

TABLE 1

| Example No. | Average molecular weight | Phosphite ester Name | wt %* | Birefringence (nm) | Number of defects | CN ratio** (dB) |
|---|---|---|---|---|---|---|
| Experiment Example 1 | 15000 | Tris(nonylphenyl) phosphite | 0.0005 | 10 | 100 | −0.2 |
| Experiment Example 2 | 15000 | Tris(nonylphenyl) phosphite | 0.001 | 11 | 50 | −0.5 |
| Experiment Example 3 | 15000 | Tris(nonylphenyl) phosphite | 0.0025 | 10 | 30 | −0.7 |
| Experiment Example 4 | 15000 | Tris(2,4-di-t-butyl-phenyl) phosphite | 0.0005 | 12 | 80 | −0.1 |
| Experiment Example 5 | 15000 | Tris(2,4-di-t-butyl-phenyl) phosphite | 0.001 | 10 | 40 | −0.8 |
| Experiment Example 6 | 15000 | Tris(2,4-di-t-butyl-phenyl) phosphite | 0.0025 | 11 | 30 | −0.9 |
| Experiment Example 7 | 17000 | 2-Ethylhexyldiphenyl phosphite | 0.001 | 15 | 60 | −0.4 |
| Experiment Example 8 | 17000 | 2-Ethylhexyldiphenyl phosphite | 0.0025 | 18 | 40 | −0.8 |
| Experiment Example 9 | 20000 | 2-Ethylhexyldiphenyl phosphite | 0.001 | 30 | 80 | −0.5 |
| Comparative Example 1 | 15000 | — | 0 | 12 | 5000 | −0.2 |
| Comparative Example 2 | 15000 | Tris(nonylphenyl) phosphite | 0.01 | 13 | 30 | −3.0 |
| Comparative Example 3 | 15000 | Tris(nonylphenyl) phosphite | 0.0025 | 200 | 50 | −0.8 |

**(CN ratio after standing for 2000 hours) - CN ratio)
*with respect to the weight of polycarbonate resin.

Usually, the above-mentioned phosphite esters may be used either individually or in combination with one another. They may also be used in combination with a phosphate ester so long as it does not adversely affect the performances of the optical disc.

The invention is now described in more detail with reference to the following experiment examples.

EXPERIMENT EXAMPLES 1 to 9

Optical disc substrates each having spiral pregrooves on one side, 1.2 mm in thickness and 120 mm in diameter, were produced by injection molding from bisphenol A-based polycarbonate resins (in the pellet form) of ordinary purity having different molecular weight and containing different kinds of phosphite esters as specified below, and they were examined for birefringence.

Molecular weight of polycarbonate resins: 15,000, 17,000, and 20,000. Phosphite esters: Tris(nonylphenyl) phosphite, tris(2,4-di-t-butyl-phenyl) phosphite, and 2-ethylhexyldiphenyl phosphite. Amount of phosphite ester added: 0.0005, 0.001, and 0.0025 wt %.

Each substrate was coated with a recording film (300 to 500 Å thick) of tellurium suboxide by vacuum deposition. The thus obtained optical disc was examined by using a testing player unit to see how many defects longer than 30 μm in the circumferential direction were present on the disc surface. In addition, the optical disc was examined for CN ratio after standing in an atmosphere at 80° C. and 80% RH for a prescribed period of time. The results are snown in Table 1.

For comparison, the same procedure as mentioned above was repeated except that the polycarbonate resin was replaced by one having an average molecular weight of 25,000, and the amount of phosphite ester was changed to none or 0.01 wt %. The results are also shown in Table 1.

In the meantime, the birefringence was measured using a polarization microscope (made by Nippon Kogaku K.K.) equipped with a Senarmont compensator.

EXPERIMENT EXAMPLE 10

An optical disc substrate having spiral pregrooves on one side, 1.2 mm in thickness and 120 mm in diameter, was produced by injection molding from bisphenol A-based polycarbonate resin (in the pellet form) of ordinary purity having a molecular weight of 15,000 and containing 0.002 wt % of tris(nonylphenyl) phosphite.

The substrate was coated with a GdTdFe-based recording film by sputtering. The thus obtained optical disc was examined by using a testing player to see how many defects longer than 30 μm in the circumferential direction were present on the disc surface. In addition, the optical disc was examined for CN ratio after standing in an atmosphere at 80° C. and 80% RH for 2000 hours. The results were as follows: Twenty large defects were found, and the CN ratio decreased by 0.9 dB after standing as compared with the initial value.

For comparison, the same procedure as mentioned above was repeated except that the amount of phosphite ester was changed to 0.01 wt %. The results were as follows: Five large defects were found, and the CN ratio decreased by 4 dB after standing in the above atmosphere as compared with the initial value.

EXPERIMENT EXAMPLE 11

Optical disc substrates having spiral pregrooves on one side, 1.2 mm in thickness and 120 mm in diameter, were produced by injection molding from bisphenol A-based polycarbonate resins (in the pellet form) of varied purity having a molecular weight of 15,000.

The substrate was coated with a tellurium suboxide recording film (300 to 500 Å thick) by vacuum deposition. The thus obtained optical discs were examined by using a testing player to see how many defects longer than 30 μm in the circumferential direction were present on the disc surface. In addition, the optical discs were examined for CN ratio after standing in an atmosphere at 80° C. and 80% RH for 2000 hours. The results are shown in Table 2.

In the meantime, the purity of the polycarbonate resin was measured as follows: The pellets were crushed and the resulting powder (1 g) was extracted with 50 ml of boiling pure water. The conductivity of the extract thus obtained was measured using a conductivity meter. In the case of polycarbonate resin of low purity, the conductivity was high.

TABLE 2

| Example No. | Conductivity ($\mu$S/cm) | Number of defects | CN ratio* (dB) |
|---|---|---|---|
| Experiment Example 11 | 1.0 | 50 | −0.2 |
| Comparative Example 4 | 1.5 | 400 | −0.4 |
| Comparative Example 5 | 3.5 | 5000 | −0.3 |

*(CN ratio after standing for 2000 hours) - (initial CN ratio)

EXPERIMENT EXAMPLES 12 to 14

Optical disc substrates each having spiral pregrooves on one side, 1.2 mm in thickness and 120 mm in diameter, were produced by injection molding from bisphenol A-base polycarbonate resins (in the pellet form) having a varied molecular weight of 15,000, 17,000, and 20,000 and containing no phosphite esters, and they were examined for birefringence. The extract of the pellets had a conductivity of 1.0 $\mu$S/cm.

Each substrate was coated with a recording film (300 to 500 Å thick) of tellurium suboxide by vacuum deposition. The thus obtained optical disc was examined by using a testing player to see how many defects longer than 30 $\mu$m in the circumferential direction were present on the disc surface. In addition, the optical disc was examined for CN ratio after standing in an atmosphere at 80° C. and 80% RH for a prescribed period of time. The results are shown in Table 3.

For comparison, the same procedure as mentioned above was repeated except that the polycarbonate resin was replaced by one having an average molecular weight of 25,000 and containing an antioxidant, and by one having an average molecular weight of 15,000 and containing 0.01 wt % of tris(nonylphenyl) phosphite. The results are also shown in Table 3.

In the meantime, the birefringence was measured using a polarization microscope (made by Nippon Kogaku K. K.) equipped with a Senarmont compensator. The measurements were carried out along a circle 110 mm in diameter on the optical disc substrate.

TABLE 3

| Example No. | Average molecular weight | Antioxidant | Birefringence (nm) | Number of defects | CN ratio* (dB) |
|---|---|---|---|---|---|
| Experiment Example 12 | 15000 | — | 10 | 50 | −0.2 |
| Experiment Example 13 | 17000 | — | 15 | 36 | −0.5 |
| Experiment Example 14 | 20000 | — | 30 | 45 | −0.4 |
| Comparative Example 6 | 25000 | — | 200 | 60 | −0.8 |
| Comparative Example 7 | 15000 | tris-(nonylphenyl) phosphite | 12 | 20 | −3.0 |

*(CN ratio after standing for 2000 hours) - (initial CN ratio)

EXPERIMENT EXAMPLE 15

An optical disc substrate having spiral pregrooves on one side, 1.2 mm in thickness and 120 mm in diameter, was produced by injection molding from biphenol A-based polycarbonate resin (in the pellet form) having a molecular weight of 15,000 and containing no antioxidant. The extract of the pellets had a conductivity of 1 $\mu$S/cm.

The substrate was coated with a GdTbFe-based recording film by sputtering. The thus obtained optical disc was examined by using a testing player to see how many defects longer than 30 $\mu$m in the circumferential direction were present on the disc surface. In addition, the optical disc was examined for CN ratio after standing in an atmosphere at 80° C. and 80% RH for 2000 hours. The results were as follows: Forty large defects were found, and the CN ratio decreased by 0.4 dB after standing in the above atmosphere as compared with the initial value.

For comparison, the same procedure as mentioned above was repeated except that the polycarbonate resin was incorporated with 0.01 wt % of tris(nonlyphenyl) phosphite. The results were as follows: Six large defects were found, and the CN ratio decreased by 4.5 dB after standing as compared with the initial value.

In the above-mentioned examples, the disc substrate was coated with a tellurium suboxide film or optomagnetic recording film; but the present invention can be applied to a compact disc having a deposited aluminum film and also to a CD-ROM which is an advanced product of compact disc.

What is claimed is:

1. An optical disc which comprises an optical disc substrate of bis(hydroxyphenyl)alkane polycarbonate resin and a recording film formed thereon, said polycarbonate resin having an average molecular weight of 13000 to 22000 and containing 0 to 0.0025 wt % of phosphite ester represented by the following structural formula:

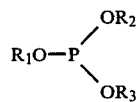

where $R_1$ and $R_2$ are alkyl groups or aryl groups, and $R_3$ is a hydrogen atom, alkyl group, or aryl group.

* * * * *